United States Patent

[11] 3,603,167

[72] Inventor Henry L. Arce
 Huntington Park, Calif.
[21] Appl. No. 48,847
[22] Filed June 11, 1970
[23] Continuation of Ser. No. 809,529,
 Mar. 24, 1969, abandoned
[45] Patented Sept. 7, 1971
[73] Assignee Ametek, Inc.
 New York, N.Y.

[54] CONTROL DEVICE
 9 Claims, 5 Drawing Figs.
[52] U.S. Cl. .................................................. 74/388,
 114/144
[51] Int. Cl. ................................................ F16h 35/00,
 B63h 25/14
[50] Field of Search .................................... 74/388 R;
 114/144

[56] References Cited
 UNITED STATES PATENTS
1,815,345 7/1931 Colman ........................ 74/785
2,105,473 1/1938 Dean ............................ 60/52
2,997,895 8/1961 White ........................... 74/785

Primary Examiner—Leonard H. Gerin

ABSTRACT: A gear train mechanism with a motor input, a planetary clutch and an output shaft with load responsive clutch disengagement means is provided by a toothed outer casing on the planetary clutch with a detent to engage the teeth mounted on a pivotable arm. The arm is retained in the clutch engaging position by a solenoid. The solenoid core is mechanically linked to the arm through a resilient linkage. The solenoid is connected to a suitable e.m.f. with a normally open microswitch which is held in the closed position by a second detent on the arm. Excessive loading overcomes the resilient linkage between the core and the arm, permitting the arm and its clutch detent to rock from engagement with the toothed clutch casing. This displacement opens the microswitch, deactivating the solenoid and releasing the planetary clutch. The mechanism is particularly useful for any automatic control function where it is desired to have manual override provision which will disengage the automatic control. It is particularly useful in the linkage between the rudder and the power unit of an automatic pilot. Another application would be in the mechanical linkage between a valve actuation motor and a valve for remotely controlled valves such as underwater valves.

INVENTOR.
HENRY L. ARCE
BY
ATTORNEY

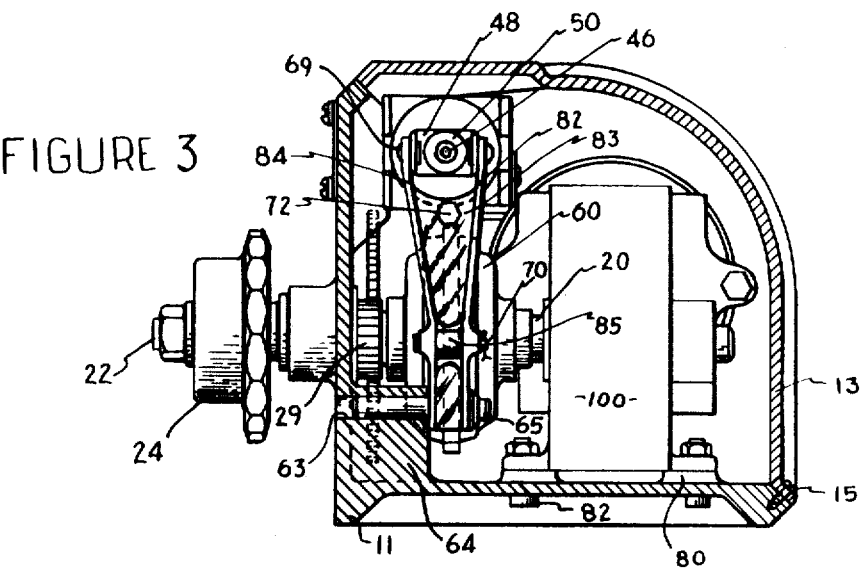

CONTROL DEVICE

This application is a continuation of application Ser. No. 809,529, filed Mar. 24, 1969, now abandoned.

DESCRIPTION OF THE INVENTION

The invention relates to a gear train mechanism and in particular relates to such a mechanism with clutch means having a manual override and declutching means.

The invention is applicable to control functions having a first automatic control input and a second manual input with the manual input means operative to disengage the automatic input and assume the entire control function. The invention is specifically applicable to an automatic pilot for craft, particularly for relatively inexpensive autopilots for marine craft. A typical autopilot in which the invention can be used is shown in the copending application Ser. No. 610,916, now U.S. Pat. No. 3,465,221, which is incorporated herein by reference.

A difficulty which is experienced with autopilots occurs when an unexpected navigational hazard is encountered along a preset course. In such emergencies, precious seconds are often lost in declutching the motor drive of the autopilot from the rudder before control can be assumed from the helm.

It is an object of this invention to provide a gear train mechanism with declutching means responsive to a predetermined load.

It is an object of this invention to provide the aforesaid mechanism with provision to adjust the declutching means to varied loading.

It is a further object of this invention to connect a motor input to a control function with said gear train mechanism.

It is a still further object of this invention to provide a manual input to said control function.

It is an additional object of this invention to provide said mechanism in a marine craft autopilot.

Other and related objects will be apparent from the following description of the invention.

The mechanisms of this invention which secures the aforesaid objects employs a planetary clutch with an input shaft and an output shaft and a clutch casing having a toothed outer periphery with brake means about the periphery of the casing comprising a brake support arm movably mounted on the supporting frame of the assembly, detent means on the support arm so as to be movable between an engaged and disengaged position with the toothed casing by movement of the arm, electromagnetic means to generate a magnetic field, a magnetically susceptible plunger movable between first and second positions in the magnetic field, resilient means connecting the plunger to the brake support arm to thereby move the arm and the clutch detent means into one of the engaged and disengaged positions, a source of electrical energy, conductor means between said source and the electromagnetic means, normally open switch means in said conductor means and switch closing means carried by the arm to depress the lever of said switch into a closed position when the arm is moved into said one of said positions. In preferred embodiments, the tension of the resilient means can be varied by adjustment means incorporated in the mechanical linkage between the plunger and the arm. Similarly, adjustment means are provided on the switch closing means to adjust the degree of movement of the arm that is necessary to open and close the switch means.

The invention will now be described by reference to the FIGURES, of which:

FIG. 3 is a view along line 3—3' of FIG. 2;

FIG. 4 is an enlarged view of the planetary clutch used in the invention; and

FIG. 5 is a simplified diagram of the invention as incorporated in said autopilot.

Figure 1:
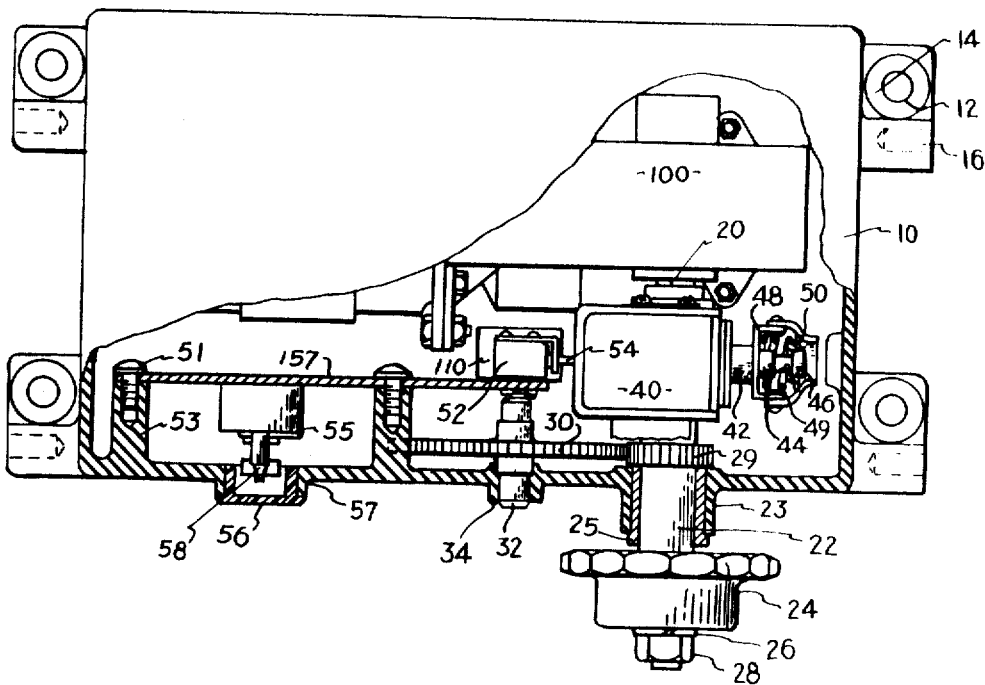
FIG. 1 is a view of the gear train mechanism as embodied in the motor control unit of an autopilot such as described in the aforesaid copending application.

Referring now to FIG. 1, the gear train is shown encased in a watertight casing 10 that forms a support frame with mounting lugs that are bored at 12 and bored and tapped at 16 to receive mounting bolts. A portion of the top of the casing 10 is cut away to reveal that the mechanism comprises a motor unit 100 with a gear train input shaft 20 and an output shaft 22. Shaft 22 is journaled in boss 23 of casing 10 with bearing 25 and bears sprocket 24 which is secured to the outboard end of the shaft with a keyed or splined fit. Lock washer 26 and nut 28 retain the sprocket on the shaft. Shaft 22 also carries a pinon 29 on the interior of casing 10 which meshes with pinon 30 that is supported on shaft 32 which is journaled in boss 34 in casing 10. The shaft 32 is connected to the shaft of a potentiometer 110 which is also identified as element 110 in Ser. No. 610,916 and which operates in a rudder position feedback circuit to the control or course setting unit of the autopilot.

Mounted above the gear train mechanism and, in FIG. 1, obscuring the view of the planetary clutch, is the electromagnetic clutch engagement means. This comprises solenoid 40 with a reciprocating plunger or core which has a neck 44 of reduced diameter which is bored and tapped to receive socket head screw 46. The reduced neck 44 passes through a bore in yoke 48 which loosely fits about the neck. A compression spring 49 is mounted between yoke 48 and a retainer disc 50 which bears against the head of screw 46. Spring 49 biases the yoke against the shoulder of the plunger 42 with the degree of tension on the spring being adjustable by advancing or retracting screw 46.

The remaining elements appearing in FIG. 1 comprise a printed circuit board 157 secured by screws 51 to legs 53 that extends from the interior wall of the casing. The electrical components of the rudder control circuit which are mounted on the circuit board 157 are described in detail with regard to FIG. 6 of Ser. No. 610,916. The circuit board also supports the microswitch 52, a normally open switch that is actuated by push rod 54. The circuit board supports variable resistor 55 which is connected in parallel to potentiometer 110 as described in greater detail with regard to FIG. 5. The casing 10 has a boss 57 which is bored to receive a plastic insert or seal 56 which can be removed to permit adjustment of the shaft 58 of the variable resistor.

Figure 2:
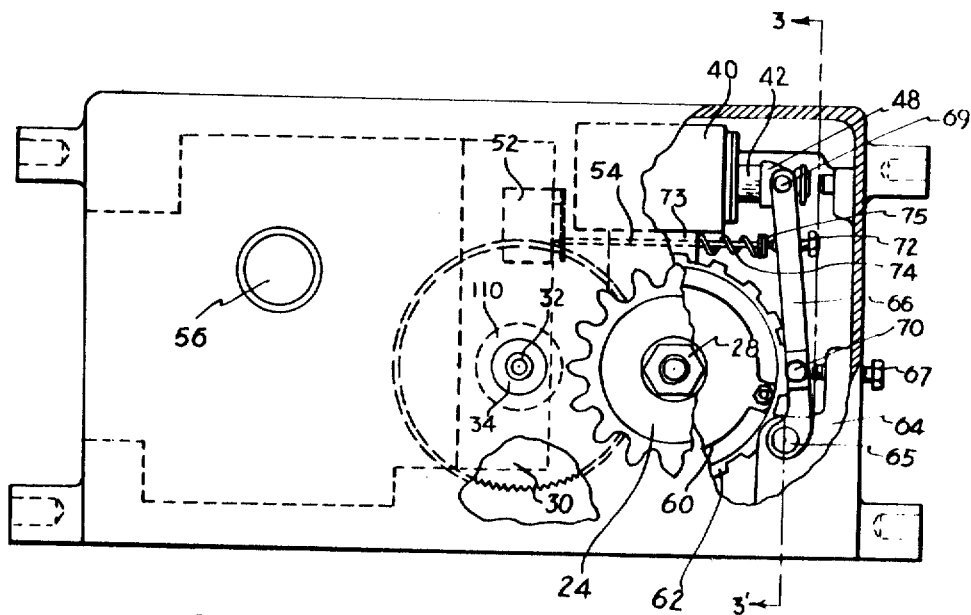
FIG. 2 is a side view of the unit of FIG. 1.

In FIG. 2, a portion of the side of the casing is cut away to reveal the planetary clutch 60 which has a toothed outer rim 62. Brake arm 66 is pivotably supported on casing 10 by pin 65 which passes through a bore in shoulder 64 that is cast in the casing. The opposite end of arm 66 is secured to yoke 48 by rivets 69. Casing 10 is bored and tapped to receive screw 67 which extends into the casing cavity with its inboard end opposite pin 70. The advancement or retraction of screw 67 can be used to limit the amount of movement of arm 66. If it is ever desired to lock out the override provision, the screw can be advanced to lock the arm in the engaged position.

Carried at an intermediate point on arm 66 is pin 70 which supports a roller described in greater detail with reference to FIG. 3. This roller serves as a detent to engage the toothed outer rim of clutch 60. Also carried by arm 66 at an intermediate location is screw 72 which is positioned opposite push rod 54 that is supported by bracket 73. Bracket 73 is secured to casing 10. A spring 74 is mounted about rod 54 to bias against retaining washers 75 and thereby urge rod 54 against screw 72 and away from the lever of microswitch 52.

FIG. 3 is a sectional view along line 3—3' of FIG. 2. This view shows casing 10 formed by base 11 and cover 13 secured thereto by screws 15. Base 11 has raised bosses 80 which are bored to receive bolts 82 that secure the motor 100 to the base. Clutch 60 is shown on shaft 20 from the motor with an output shaft 22 supporting pinon 29 and sprocket 24. Arm 66 is shown with two side rails 82 and 84 and a web 83 between the rails. Screw 72 which engages push rod 54 is supported by web 83. The clutch detent is shown as roller 85 that is mounted on pin 70 which passes through the side rails 82 and 84. A cotter pin can be used to retain the pin 70. The web 83 is removed from between the rails to permit mounting of the roller 85 between the rails. As previously mentioned, brake arm 66 is pivotably mounted to the casing by pin 65. This pin engages a bore 63 in shoulder 64 of base 11. AT its opposite end, arm 66 is fastened to yoke 48 by rivets 69 and, as previously mentioned, yoke 48 is connected to plunger 42 with screw 46 and spring retainer 50.

FIG. 4 illustrates the planetary clutch used in the invention. The clutch is a conventional epicyclic gear train, however, the housing is modified to provide a toothed rim 62 for engagement by roller 85. The clutch assembly is formed from housing 95, ring gear 98 and end cap 93 which are retained by bolts 96. The housing 95 and cap 93 have central bosses 97 and 91 which are bored to receive, respectively, the output and input shafts of the clutch. The clutch has a sun gear 90 that has a sleeved end 92 which is journaled in boss 91 of end cap 93. A bearing 94 surrounds the sleeve 92. At least one, and preferably, three planet gears 99 are supported between ring gear 98 and sun gear 90 to interconnect these gears. The planet gears are mounted on a cup shaped cage 109 which has a skirt 101 surrounding the sun gear. The skirt is slotted as shown at 102 to receive the planet gears and bored at 103. Bearings 104 are mounted in bores 103 and a pin 105 is journaled in the bearings to support the planet gear 99. A bushing 106 having a rim 107 is mounted in the central bore of sun gear 90 and cage 109. Cage 109 is journaled in boss 97 with bearing 108 and has a shaft extension 22 with a threaded end for nut 28, previously mentioned.

FIG. 5 shows a typical application of the mechanism of this invention. The device is applied to an autopilot of the type described in the aforementioned copending application. This autopilot comprises a compass card unit 120, a course sensing and setting circuit 121, a terminal barrier strip 180 and a rudder motor and motor control circuit 122. These circuits are illustrated in FIG. 6 of Ser. No. 610,916 in greater detail and reference is made to this application for the description of these circuits.

The power supply to the autopilot is battery 199 which can be connected by depressing normally open switch 172. Coil 123 is the coil of solenoid 40 and the resulting current flow in this coil moves plunger 42 and arm 66 into the engagement position with the toothed rim of clutch 60, thereby mechanically linking motor 100 to sprocket 24 which is mechanically linked to the helm or to the rudder of the craft. When arm 66 is moved into the clutch engagement position, push rod 54 is also moved to close microswitch 52 so that upon release of switch 172, the power supply to the autopilot is uninterrupted.

FIG. 5 also shows the relationship of potentiometer 110 and variable resistor 55. The wiper or variable tap of potentiometer 110 is connected to shaft 32 as previously mentioned and moves proportionally with the output sprocket 24. This potentiometer then reflects the degree of rudder throw affected by the autopilot and functions in a feedback circuit through conduit 111 to the course setting unit 121. Variable resistor 55, which is in parallel to potentiometer 110, serves to control the range of the autopilot since variation of the IR drop in this shunt resistor controls the magnitude of the voltage feedback from potentiometer 110 for any degree of rudder throw.

When the helm of the craft is manually moved, sprocket 24 transmits a torque to shaft 22 and the planetary clutch 60. Since the motor input shaft 20 is stationary, the torque is transmitted to the toothed engagement of detent 85 on the rim 62 of the clutch housing. This torque causes roller detent 85 to move up the incline of the tooth on rim 62 with which it is engaged and thereby release the clutch housing. When this occurs, microswitch 52 is opened and arm 66 is released against stop screw 67. The autopilot is thereafter out of service and the craft remains under manual control until switch 172 is depressed to reactivate coil 123 of the solenoid 40.

The invention is thus described as a clutch having a manual override provision which disengages the clutch and permits manual control of a control function. The invention is, however, also applicable as a clutch having an overload disengaging means. Thus it can be used as the clutch means in an gear train where it is desired that the train be automatically disengaged when the load reaches or exceeds a predetermined maximum. This load is that which causes the aforementioned torque that is sufficient to force the roller detent 85 out of engagement wit the toothed rim 62 of the clutch housing. It is therefore apparent that the invention has application whenever an automatic declutching operation is desired when the load torque exceeds a predetermined value.

I claim:

1. In a gear train mechanism comprising a support frame, a planetary clutch mounted in said frame with an input shaft and an output shaft and a clutch casing having a toothed outer periphery, brake means about the periphery of the casing of the planetary clutch comprising a brake support arm movably mounted on said support frame, detent means on the support arm so as to be movable between an engaged and disengaged position with said toothed casing by movement of said support arm, electromagnetic means to generate a magnetic field, a magnetically susceptible plunger movable between first and second positions in said magnetic field, resilient means connecting said plunger to said brake support arm to move said arm and said detent means into one of said positions, a source of electrical energy, conductor means between said source and said electromagnetic means, normally open switch means in said conductor means and switch-closing means carried by said arm to depress the lever of said switch into a closed position when said arm is moved into said one of said positions.

2. The mechanism of claim 1 wherein adjustment means are carried by one of said plunger and said support arm whereby the tension on said resilient means can be varied to permit adjustment of the torque necessary for movement of said support arm from said one of said positions.

3. The mechanism of claim 1 wherein said arm is connected to said plunger with a lost motion link and said resilient means comprises a spring mounted between said plunger and said arm to bias said arm into said one of said positions.

4. The mechanism of claim 3 wherein said arm supports a bracket, said plunger carries an adjustment screw and said spring surrounds said screw and is positioned between said bracket and a retaining washer on said screw.

5. The mechanism of claim 1 wherein said switch closing means is adjustable to permit variation in the degree of movement of said arm necessary to depress said switch lever.

6. The mechanism of claim 1 wherein said source of electrical energy is connected to said electromagnetic means with second, normally open switch means.

7. The mechanism of claim 1 in combination with a marine craft and an autopilot wherein the motor control of the autopilot is connected to the input shaft of said mechanism is connected to the helm of said craft.

8. In an autopilot for a marine craft comprising a rudder control motor, a course control unit operatively connected to said motor to actuate said motor in response to a course deviation of said craft, linking means to connect the output shaft of said motor to the craft's rudder including planetary clutch means with load responsive disengagement means to permit manual override of the autopilot control comprising clutch actuation means movable between positions in engagement and out of engagement with the housing of said clutch to yieldably restrain said housing against rotation, resilient means biasing said clutch actuation means into one of said positions, electromagnetic means to bias said clutch actuation means into the other of said positions, a source of electrical energy connected to said electromagnetic means including switch means movable between closed and open positions and switch actuation means responsive to loading of said linking means between said motor output shaft and the craft's rudder whereby said clutch is disengaged when said load exceeds a predetermined value.

9. The autopilot means of claim 8 wherein said electromagnetic means is a solenoid operative to move said clutch actuation means into restraining engagement with the housing of said clutch.